United States Patent
Pietsch et al.

(10) Patent No.: US 11,269,053 B2
(45) Date of Patent: Mar. 8, 2022

(54) METHOD AND RADAR SENSOR FOR REDUCING THE INFLUENCE OF INTERFERENCE IN THE EVALUATION OF AT LEAST ONE RECEIVED SIGNAL

(71) Applicant: Robert Bosch GmbH, Stuttgart (DE)

(72) Inventors: Andreas Pietsch, Bietigheim-Bissingen (DE); Klaus Baur, Mietingen (DE); Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/648,808

(22) PCT Filed: Sep. 4, 2018

(86) PCT No.: PCT/EP2018/073700
§ 371 (c)(1),
(2) Date: Mar. 19, 2020

(87) PCT Pub. No.: WO2019/057480
PCT Pub. Date: Mar. 28, 2019

(65) Prior Publication Data
US 2020/0217926 A1    Jul. 9, 2020

(30) Foreign Application Priority Data

Sep. 25, 2017    (DE) .......................... 102017216867.6

(51) Int. Cl.
*G01S 7/35*    (2006.01)
*G01S 7/41*    (2006.01)
*G01S 13/931*    (2020.01)

(52) U.S. Cl.
CPC ............... *G01S 7/354* (2013.01); *G01S 7/411* (2013.01); *G01S 13/931* (2013.01); *G01S 2013/93271* (2020.01); *G01S 2013/93272* (2020.01)

(58) Field of Classification Search
CPC ........ G01S 7/354; G01S 7/411; G01S 13/931; G01S 2013/93271; G01S 2013/93272
(Continued)

(56) References Cited

U.S. PATENT DOCUMENTS 5,839,096 A * 11/1998 Lyons ................... G01S 7/4008
702/183
7,196,629 B2 * 3/2007 Ruoss .................. A61B 5/0507
340/573.1
(Continued)

FOREIGN PATENT DOCUMENTS

DE    69834710 T2 *  5/2007    ........... G01S 7/4056
DE    69834710 T2    5/2007
(Continued)

OTHER PUBLICATIONS

International Search Report for PCT/EP2018/073700, dated Dec. 3, 2018.

*Primary Examiner* — Bernarr E Gregory
*Assistant Examiner* — Nuzhat Pervin
(74) *Attorney, Agent, or Firm* — Norton Rose Fulbright US LLP; Gerard Messina

(57) ABSTRACT

A method and an apparatus for reducing the influence of interference in the evaluation of at least one received signal of a radar sensor, in particular of a radar sensor installed in a vehicle, is described. In predetermined operating situations, predetermined transmitted signals are emitted and reflected partial signals are received, and the signals received for the predetermined operating situations are stored in order to determine an interference spectrum and the (Continued)

influence of interference is reduced by taking the interference spectrum into consideration in the context of signal evaluation.

19 Claims, 3 Drawing Sheets

(58) Field of Classification Search
USPC .......................................................... 342/80
See application file for complete search history.

(56) References Cited

U.S. PATENT DOCUMENTS

| | | | | |
|---|---|---|---|---|
| 7,345,620 | B2* | 3/2008 | Voigtlaender | G01S 7/023 342/82 |
| 7,690,737 | B2* | 4/2010 | Lu | B60T 7/12 303/146 |
| 8,077,076 | B2* | 12/2011 | Walter | G01S 13/345 342/70 |
| 8,427,288 | B2* | 4/2013 | Schofield | G02B 27/01 340/425.5 |
| 8,582,809 | B2* | 11/2013 | Halimeh | G06K 9/00791 382/103 |
| 9,140,788 | B2* | 9/2015 | Kuehnle | G01S 7/411 |
| 9,412,271 | B2* | 8/2016 | Sharma | G08G 1/07 |
| 9,524,597 | B2* | 12/2016 | Ricci | B60R 25/01 |
| 9,638,796 | B2* | 5/2017 | Binzer | H01Q 1/3233 |
| 10,416,299 | B2* | 9/2019 | Schoor | G01S 13/42 |
| 10,473,753 | B2* | 11/2019 | Fischer | G01S 7/023 |
| 10,514,706 | B2* | 12/2019 | Schuh | G01S 19/14 |
| 10,520,581 | B2* | 12/2019 | Schuh | G01S 13/931 |
| 2006/0109170 | A1* | 5/2006 | Voigtlaender | G01S 7/282 342/82 |
| 2009/0121918 | A1* | 5/2009 | Shirai | G01S 7/023 342/159 |
| 2010/0249633 | A1* | 9/2010 | Droitcour | G01S 13/88 600/534 |
| 2011/0032138 | A1* | 2/2011 | Krapf | G01S 7/021 342/21 |
| 2011/0098898 | A1* | 4/2011 | Stahlin | G08G 1/095 701/70 |
| 2013/0335260 | A1* | 12/2013 | Kuehnle | G01S 7/411 342/70 |
| 2014/0095059 | A1* | 4/2014 | Kandal | G08G 1/0112 701/119 |
| 2014/0368375 | A1* | 12/2014 | Baftiu | G01S 13/931 342/70 |
| 2015/0012172 | A1* | 1/2015 | Hegemann | G01S 13/867 701/33.1 |
| 2015/0097730 | A1* | 4/2015 | Pontes | H01Q 1/40 342/385 |
| 2015/0109162 | A1* | 4/2015 | Binzer | H01Q 1/3233 342/5 |
| 2015/0331091 | A1* | 11/2015 | Abbasi | G01S 7/35 342/128 |
| 2017/0059691 | A1* | 3/2017 | Fischer | G01S 7/292 |
| 2017/0350970 | A1* | 12/2017 | Saito | G01S 7/40 |
| 2018/0101184 | A1* | 4/2018 | Shock | G05D 9/12 |
| 2020/0130771 | A1* | 4/2020 | Jacobsz Rosier | B62K 25/12 |

FOREIGN PATENT DOCUMENTS

| | | | |
|---|---|---|---|
| DE | 102009053395 A1 | 6/2011 | |
| DE | 102012108862 A1 | 5/2014 | |
| DE | 102012111933 A1 * | 6/2014 | ......... G08G 1/09623 |
| DE | 102012111933 A1 | 6/2014 | |
| DE | 102014222837 A1 | 5/2016 | |
| DE | 102017103977 A1 | 8/2018 | |
| DE | 102017103977 A1 * | 8/2018 | ............ G01S 7/038 |
| EP | 1681578 A1 | 7/2006 | |
| EP | 2845028 B1 * | 1/2016 | ............ G01S 7/524 |
| EP | 3139139 A1 * | 3/2017 | ........... G01F 23/284 |
| JP | H05240947 A | 9/1993 | |
| JP | H07151852 A | 6/1995 | |
| JP | 2001506011 A | 5/2001 | |
| JP | 2001318143 A | 11/2001 | |
| JP | 2003139847 A | 5/2003 | |
| JP | 2017142214 A | 8/2017 | |
| WO | 9919744 A1 | 4/1999 | |
| WO | WO-2005081784 A2 * | 9/2005 | ........... H01F 10/007 |
| WO | WO-2005115531 A2 * | 12/2005 | ............... A61N 1/05 |
| WO | 2007043479 A1 | 4/2007 | |
| WO | WO-2016050628 A1 * | 4/2016 | ........... G01S 13/343 |
| WO | 2016168334 A1 | 10/2016 | |
| WO | WO-2016168334 A1 * | 10/2016 | ........... G01S 13/003 |
| WO | WO-2017177972 A1 * | 10/2017 | ........... G01S 13/931 |

* cited by examiner

METHOD AND RADAR SENSOR FOR REDUCING THE INFLUENCE OF INTERFERENCE IN THE EVALUATION OF AT LEAST ONE RECEIVED SIGNAL

FIELD

The present invention relates to a radar sensor and a method for reducing the influence of interference in the evaluation of at least one received signal of a radar sensor, in particular of a radar sensor installed in a vehicle, in which, in predetermined operating situations, predetermined transmitted signals are emitted and reflected partial signals are received, and the signals received for the predetermined operating situations are stored in order to determine an interference spectrum and the influence of interference is reduced by taking the interference spectrum into consideration in the context of signal evaluation.

BACKGROUND INFORMATION

German Patent Application No. DE 10 2009 053 395 A1 describes a system and a method for monitoring target objects by way of a sensor assemblage, in which, for flexible evaluation of first target parameters for the various target objects determined via the sensor assemblage, provision is made to generate, store, and check separate user-definable test profiles, with no need for intervention in safety-relevant system components.

SUMMARY

In accordance with the present invention, interference in the sensor is recognized resulting from its installation, in particular behind a vehicle body part, and such interference signals are compensated for during the reception of object signals. Advantageous refinements and embodiments of the present invention are described herein.

Advantageously, provision is made that an example method is carried out separately for each reception channel of the radar sensor. Thanks to this feature, a multi-channel radar sensor can be separately calibrated for each channel individually in terms of interference that occurs due to multiple reflection, so that the overall result of the received signals exhibits a lower interference level than if calibration were to take place for all the reception channels together.

In accordance with an example embodiment of the present invention, it is furthermore advantageous that the radar sensor is disposed behind vehicle body parts. Modern motor vehicles prefer if possible to dispose radar sensors installed at the front or rear in such a way that they are installed in concealed fashion behind vehicle skirts, bumpers, or other body parts, so that the external appearance of the vehicle is not modified by the sensors. It is particularly advantageous in this context that the vehicle body parts behind which the radar sensor is disposed are body parts that have been produced from plastic. Plastic can be manufactured from material mixtures that allow the emitted and received radar radiation to pass very largely without modification, so that the emitted and received electromagnetic signals are influenced, and thus interfered with, as little as possible by the body parts themselves. Additionally or alternatively, it can be advantageous in this context that the body parts are painted body parts, in particular that the paint layers are metallic paints in which metal particles are present in part. Paint layers of this kind, in particular those having metal particles, exhibit in part a high level of reflectivity for electromagnetic radiation, so that painted vehicle parts, in particular vehicle parts painted with metallic paints, can result in interference with the sensor signals.

In accordance with an example embodiment of the present invention, it is furthermore advantageous that the interference is received signals that occur as a result of multiple reflections between the body part and the sensor radome. As a result of the disposition of the radar sensor behind body parts, received signals of the radar sensor pass first through the body part and then through the radome of the radar sensor. Waves moving back and forth between the radome surface and the inner side of the vehicle body parts can occur, so that multiple reflections are produced which interfere with the received signals intended to be received by the radar sensor, and reliable target-object recognition is interfered with.

In accordance with an example embodiment of the present invention, it is furthermore advantageous that the predetermined operating situations are a standstill state of the vehicle. The vehicle surroundings are no longer moving relative to the vehicle when the vehicle is at a standstill, so that stationary objects are also ascertained by the vehicle sensor as fixed objects. During driving operation, even fixed objects move relative to the sensor, so that distance values and relative speed values are changeable. At a standstill, however, fixed objects can be recognized over numerous measurement cycles as objects having a constant distance value and a relative speed equal to zero, and an advantageous sensor calibration can be carried out by way of such fixed objects. An operating situation of this kind occurs, for example, when the vehicle is stopped at a red light, so that during driving operation, interference due to multiple reflections of the received signals can be regularly recalibrated in standstill off-times of this kind. A vehicle standstill at a traffic light is possible, for example, using data of a navigation database which stores information regarding intersections at which traffic-light control is provided. When the host vehicle stops at such an intersection, it is possible to infer therefrom that the vehicle is currently stopped at a red light. Alternatively or in addition thereto, it is also possible for the vehicle to have a camera on the front side of the vehicle which is oriented in the direction of travel and images the area in front of the vehicle. A vehicle front camera of this kind can recognize, for example, traffic lights and thus red traffic-light phases, and can thus begin a sensor calibration and terminate it in timely fashion before the vehicle drives off again after switchover to a green light.

In accordance with an example of the present invention, it is furthermore advantageous that the predetermined transmitted signals are signals having an accurately predetermined signal shape and signal power level. The transmitted signals emitted during the predetermined operating situations should be emitted with high accuracy in terms of signal shape and signal power level, so that on the basis of the received signals, interference due to multiple reflections can be recognized as exactly as possible, and a maximally exact calibration for driving operation can be carried out.

In accordance with an example embodiment of the present invention, It is furthermore advantageous that the method is carried out separately for each reception channel of the radar sensor.

In accordance with an example embodiment of the present invention, It is furthermore advantageous that the received signals for the predetermined transmitted signals are averaged over several signal cycles. This feature has the advantageous effect that interference which occurs frequently in the calibration signal is given more consideration than interference which occurs only infrequently, for example appears only once over several signal cycles. It is thereby possible to generate a calibration signal that weights in terms of frequency of occurrence the frequency of occurrence of the interference that occurs, and can thus optimally correspond to different driving situations.

In accordance with an example embodiment of the present invention, it is furthermore advantageous that the averaged signals are added to the previous correction signal. When a new sensor calibration is carried out with the vehicle at a standstill, it is thus not necessary to delete the previous correction signal and replace it with the new signal, but instead it is possible to add the newly ascertained calibration signal, optionally with a corresponding weighting, to the already existing calibration signal. The result thereof is that calibration signals that compensate for interference patterns are not completely determined de novo by a calibration operation, so that incorrect measurements during the calibration operation have less dramatic consequences for subsequent driving operation, since outliers have only a less-weighted effect on the correction signal, and frequently occurring interference is taken into consideration with a greater weight. It is possible to ascertain an averaged signal for each respective reception channel and to separately determine a correction signal for each reception channel and, in the context of a new calibration, to carry out separately the weighted addition of the new calibration signal for each reception channel.

In accordance with an example embodiment of the present invention, It is furthermore advantageous that the radar sensor has several reception channels, and that the interference spectrum is separately detected and/or separately stored and/or separately considered for each channel. It is thereby possible to ascertain channel-specific interference, and to eliminate it from the received signals separately for each channel by way of the correction signal.

In accordance with an example embodiment of the present invention, it is furthermore advantageous that for each of the several reception channels, a separate memory device or a separate region of a common memory device is provided, within which a dedicated interference spectrum for each reception channel is stored. An interference spectrum can thus be stored for each reception channel in a memory reserved especially for it; or, when a common memory is used for all the interference spectra of the several reception channels, those various spectra can be stored in one memory device.

In accordance with an example embodiment of the present invention, it is furthermore advantageous that the means for recognizing the at least one predetermined operating situation is embodied to deliver a signal to the radar sensor. Provision can be made in this context that the signal that is delivered to the radar sensor is a signal that represents the standstill state of the vehicle, for example by the fact that a wheel rotation speed sensor is evaluated or a video image is evaluated or a speedometer signal is evaluated. The predetermined operating situation can furthermore be recognized by the fact that a signal which is the recognition of a red light applicable to the vehicle is delivered to the radar sensor. Provision is advantageously made for this purpose that a camera is provided in the front region of the vehicle, which camera images the area in front of the vehicle in a direction of travel and can detect a red light at the side of the road or a red light suspended above the lane which is associated with the car's lane, and can thereby recognize that the vehicle is at a standstill at a red light, and optionally how long the vehicle has been at a standstill. Once a predetermined operating situation has been recognized, emission of the predetermined transmitted signals for sensor calibration is started, and the received signals that are then received, in particular the received signals that have been reflected from stationary or fixed objects, are evaluated and a search is made for multiple reflections in the received signal which are evaluated in order to ascertain the correction signal.

In accordance with an example embodiment of the present invention, it is furthermore advantageous that the radar sensor is disposed behind a vehicle body part. It can be advantageous in this context that the body part is produced from plastic, since the electromagnetic radiation that is emitted and received by transmitted and received signals is thereby impaired very little. The present invention can be particularly advantageous when the radar sensor is used in a situation in which the body parts are painted, in particular are painted using metallic paints which contain metal particles, since as a result the paint layers have elevated reflectivity and the received signal has a particular tendency toward interference. Such interference can be particularly efficiently reduced or even eliminated by the method and the apparatus according to the present invention.

Implementation of the example method according to the present invention in the form of a control element that is provided for a control device of an adaptive spacing control system or speed control system of a motor vehicle may be particularly important. A program that is executable on a computation device, in particular on a microprocessor or signal processor, and is suitable for performing the method according to the present invention, is stored on the control element. In this case, the present invention is therefore implemented by a program stored on the control element, so that said control element equipped with the program represents the present invention in the same way as the method for whose execution the program is suitable. An electrical memory medium can be utilized in particular as a control element.

Further features, potential applications, and advantages of the present invention are evident from the description below of exemplifying embodiments of the present invention which are depicted in the Figures. All features described or depicted in that context, individually or in any combination, constitute the subject matter of the present invention, regardless of their respective presentation or depiction in the description or in the figures.

BRIEF DESCRIPTION OF THE DRAWINGS

Exemplifying embodiments of the present invention are explained below with reference to the figures.

DETAILED DESCRIPTION OF EXAMPLE EMBODIMENTS

Figure 1:
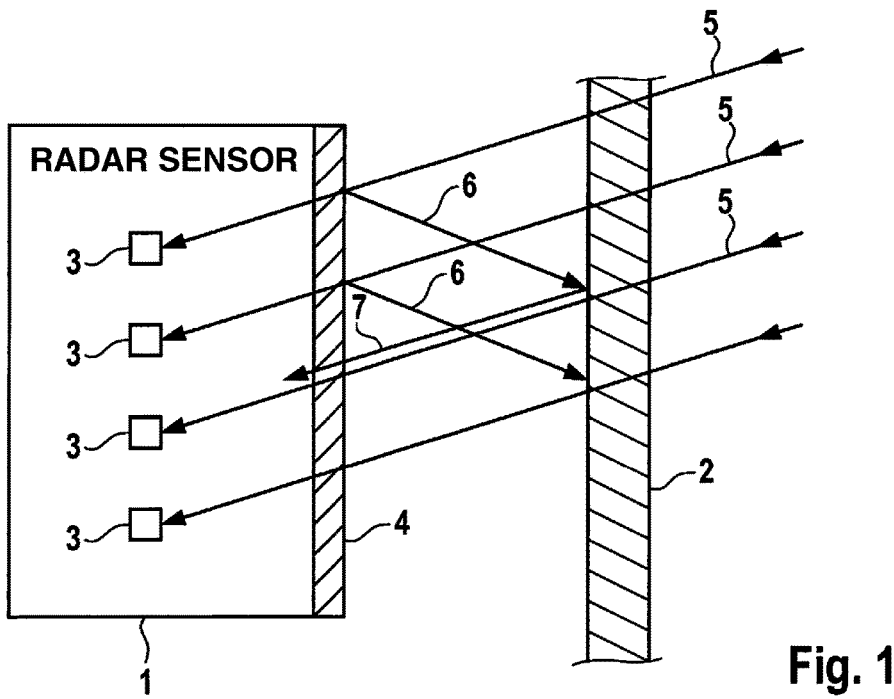
FIG. 1 schematically depicts a radar sensor installed behind a vehicle body part, with resulting multiple reflections.

FIG. 1 schematically depicts a radar sensor 1. Radar sensor 1 is made up of a half-shell housing that is closed off on the front side by a radome 4. Radome 4 can have a focusing system, for example in the form of a dielectric lens, or can be embodied without a focusing system so that emitted and received electromagnetic radiation passes through radome 4 with no modification of the beam path. Also depicted in front of radar sensor 1, having radome 4, is a body part 2 that advantageously is a plastic body part, often also painted in body-color paint having metal particles. Because radar sensor 1 is installed behind body part 2, radar sensor 1 is not visible to a viewer, so that interference with the visual appearance of the vehicle is not impaired by sensors on the vehicle. Radar sensor 1 possesses antennas, in particular reception antennas, in its interior. By way of reception antennas 3, it is possible to receive received signals that were previously emitted by way of a transmitting antenna (not depicted) and were reflected at objects in the sensor detection region. Received beams of this kind which were reflected at objects within the sensor detection region are depicted by way of beams 5. This electromagnetic radiation, which is incident as received beams, passes through body part 2, which was produced from a material that influences the beam path of the electromagnetic radiation as little as possible. Body part 2 is furthermore painted, and optionally equipped with additional coatings, in such a way that received beams 5 in the form of electromagnetic radiation penetrate body part 2 as completely as possible, and as little radiation as possible is reflected away. After passing through body part 2, the electromagnetic radiation of received beams 5 is incident onto radome 4 of radar sensor 1; a first portion of the received energy passes through radome 4 and can be absorbed by reception antennas 3 as received signals. A second portion of received beams 5 is reflected at the radome surface and reflected back at an angle of reflection toward body part 2 as reflected partial beams 6. This partial radiation 6 in turn strikes the inner side of body part 2 and can be reflected there again; in the least favorable case, this further reflection reflects almost the entirety of the reflected partial beams 6 as doubly reflected partial beams 7. These doubly reflected partial beams move almost parallel to the original received beams 5 and for the most part pass through radome 4, so that they are also received and evaluated by reception antennas 3. Reception antennas 3 thus receive the directly received radiation 5, but also the partial beams reflected twice or even several times, which are received in the form of echoes and represent an interference signal with respect to the desired received signal. These interference signals due to multiple reflection should be avoided so that maximally reliable operation of radar sensor 1 can be ensured, and reliable object detection can be carried out.

Figures 2A, 2B:
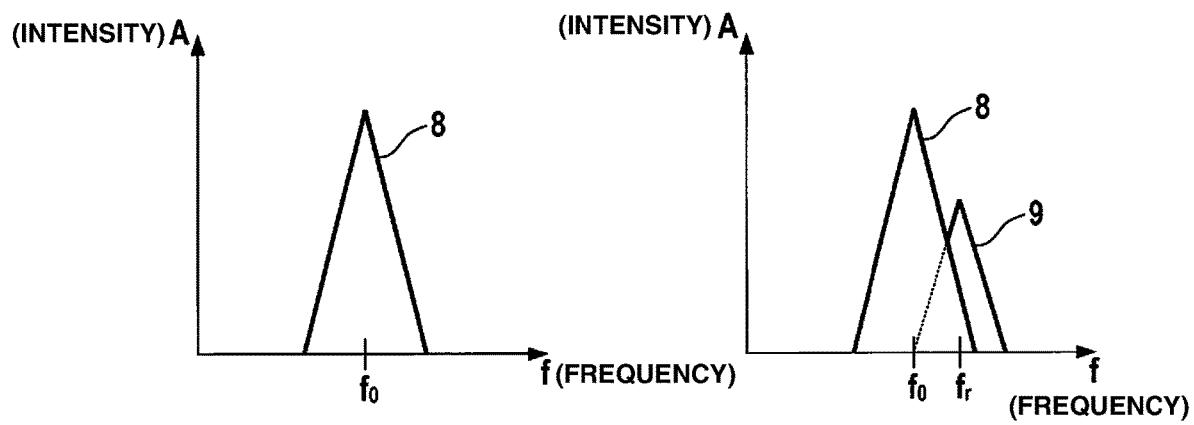
FIG. 2 schematically depicts the effect of interference in the frequency spectrum.

After received beams 5 are evaluated, the reception situation as depicted in FIG. 1 results in frequency spectra such as those depicted by way of example in FIGS. 2*a* and 2*b*. In FIG. 2*a*, frequency f is plotted on the abscissa and intensity A on the ordinate. When received signal 5 is received with no occurrence of multiple reflections 6, 7, the result is an intermediate-frequency signal 8, depicted by way of example, at a center frequency $f_0$, which can be evaluated and analyzed without interference. In the case in which multiple reflections 6, 7 occur and are overlaid on received signal 5, the result is an intermediate-frequency signal as depicted in FIG. 2*b*. Here as well, frequency f of the intermediate-frequency signal was again depicted on the abscissa, and amplitude A on the ordinate. As in FIG. 2*a*, FIG. 2*b* again depicts an exemplifying intermediate-frequency signal 8 that once again has a center frequency $f_0$. Multiple reflections 6, 7 produce an interference spectrum 9 that has a lower amplitude A than the interference-free intermediate-frequency signal 8 and has a center frequency $f_r$. Because center frequency $f_r$ of interference spectrum 9 is only a short distance away from center frequency $f_0$ of intermediate-frequency spectrum 8, the two spectra overlap over wide frequency regions, so interference spectrum 9, or the multiple reflections, cannot be filtered out of the received signal. If previously known signals are emitted as transmitted signals during specific operating states, in particular with the vehicle at a standstill, the shape and intensity of the interference-affected intermediate-frequency spectrum 8 is then known. If interference influences 9 are overlaid during that measurement, it is then possible, by calculating a difference during the predetermined operating situations, to ascertain and store the current interference spectrum. By subtracting the interference signal from the interference-affected reception spectrum 8, as depicted in FIG. 2*b*, it is possible largely to eliminate interference due to multiple reflections 6, 7, and thus to determine a more reliable and more accurate determination of the object data from the received signal.

Figure 3:
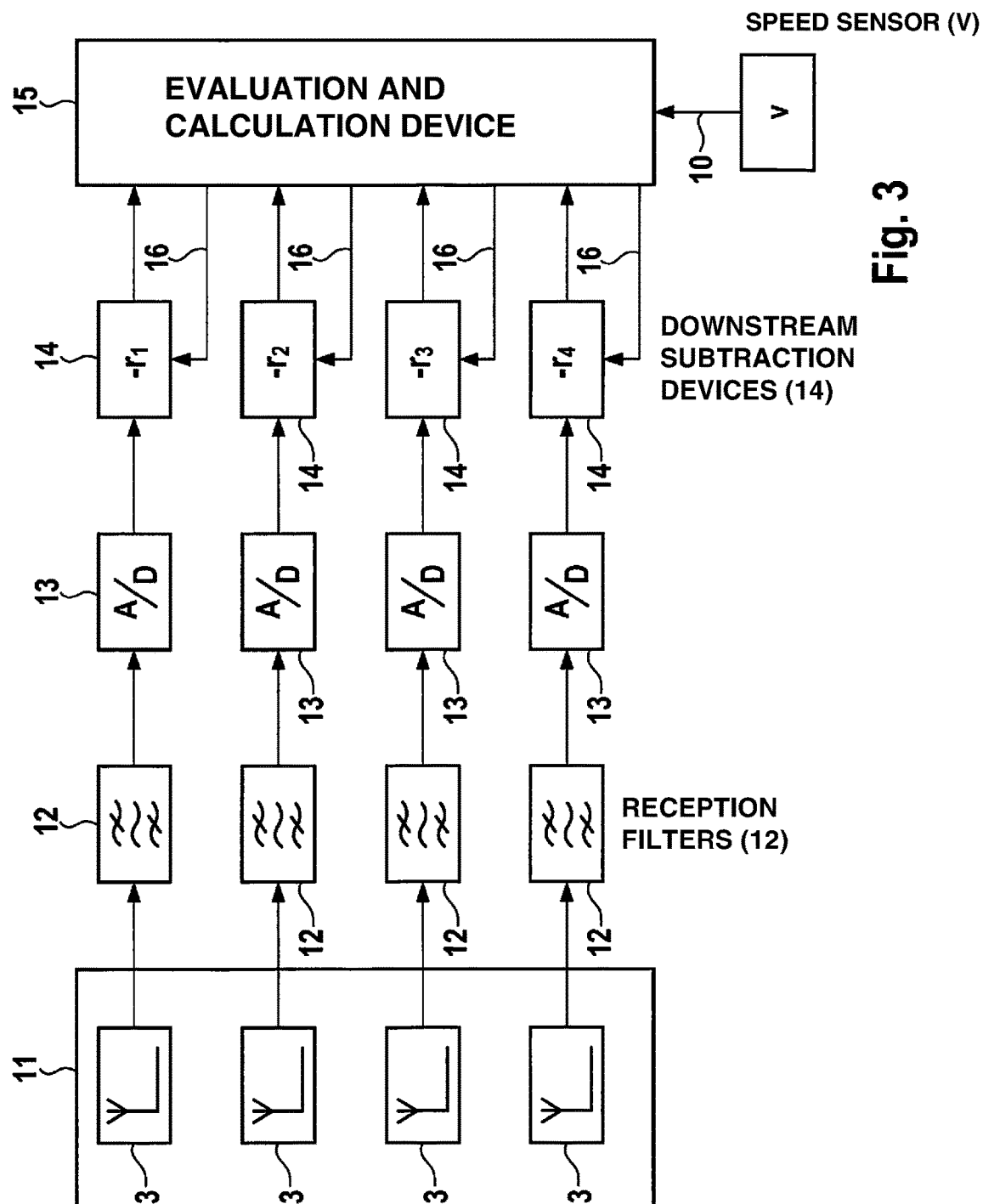
FIG. 3 shows an embodiment of the receiving section of the apparatus according to the present invention.

FIG. 3 schematically depicts an embodiment of the apparatus according to the present invention. Body part 2 that covers radar sensor 1 is depicted on the left. Disposed behind body part 2 is radar sensor 1, having a radome 4 that is embodied with or without a focusing system. The housing of radar sensor 1, like radome 4, is not depicted in FIG. 3 in the interest of clarity. Radar sensor 1 that is depicted by way of example has four reception channels that process and evaluate received signals in parallel. A reception module 11 is thus depicted, which can be, for example, a high-frequency module of radar sensor 1. This high-frequency module 11 has three reception antennas that receive received beams 5 and are also overlain by multiple reflections 6, 7 of the received beams. These interference-affected received signals are forwarded from reception antennas 3 to a reception filter 12, a separate reception filter 12 being provided for each reception channel. This reception filter 12 can be, for example, a bandpass filter that filters undesired frequency components out of the received spectrum. This reception filter 12 is not, however, capable of filtering interference signal 9, which is overlaid to a very large extent, out of received signal 8. The filtered received signal is outputted in each reception channel from reception filter 12 to an analog/digital converter 13, a separate analog/digital converter 13 again being provided for each reception channel. In an alternative embodiment, a very high-performance analog/digital converter 13 can also scan all the channels by the fact that it successively scans the reception channels. In a preferred embodiment, analog/digital converters 13 convert the filtered received signals, simultaneously and in parallel for each channel, into digital signals. In the downstream subtraction device 14, which once again is embodied, by way of example, separately for each reception channel, an interference signal 16 is delivered from an evaluation and calculation device 15. This delivery of the calculated and previously ascertained interference signal $r_1$, $r_2$, $r_3$, $r_4$ occurs by way of an output lead 16 for the interference spectrum $r_x$ from evaluation and calculation device 15, interference spectra $r_1$, $r_2$, $r_3$, $r_4$ for each reception channel being stored in a memory device. By subtraction of the respective interference spectrum $r_x$ in subtraction device 14, an interference spectrum ascertained just previously, which results from multiple reflections 6, 7, is subtracted from the current received signal so that a maximally interference-free received signal is outputted from subtraction device 14 to evaluation and calculation device 15. In evaluation and calculation device 15, the received signals are evaluated in terms of recognized objects and, for example, lists of recognized objects in the vehicle surroundings are generated and utilized for further vehicle functions, for example for emergency braking functions or adaptive spacing control and speed control functions. When the vehicle is stationary, for example because it is stopped at a red light, that fact is recognized by speed sensor v, which can be e.g. a wheel rotation sensor, and a speed signal 10 is outputted to evaluation and calculation device 15. The result of this is that in evaluation and calculation device 15, evaluation of the received signals is interrupted, and standardized transmitted signals are emitted by the transmission antennas (not depicted). Received signals 5 received during this predetermined operating situation are received by reception antennas 3 and delivered via reception filters 12 and analog/digital converters 13 to subtraction devices 14. For example, during these predetermined operating situations the output of interference spectra $r_x$ via output leads 16 can be interrupted. Evaluation and calculation device 15 thus receives, during the predetermined operating situations, received signals which derive from predetermined transmitted signals and in which interference spectra 9 due to multiple reflections are present. In evaluation and calculation device 15, an interference spectrum $r_x$ can then be ascertained and stored for each reception channel and, when the vehicle moves off again, can be delivered as a new interference spectrum $r_x$ via output lead 16 to subtraction device 14, so that the received signals received during driving operation can be compensated for using updated interference spectra.

Figure 4:
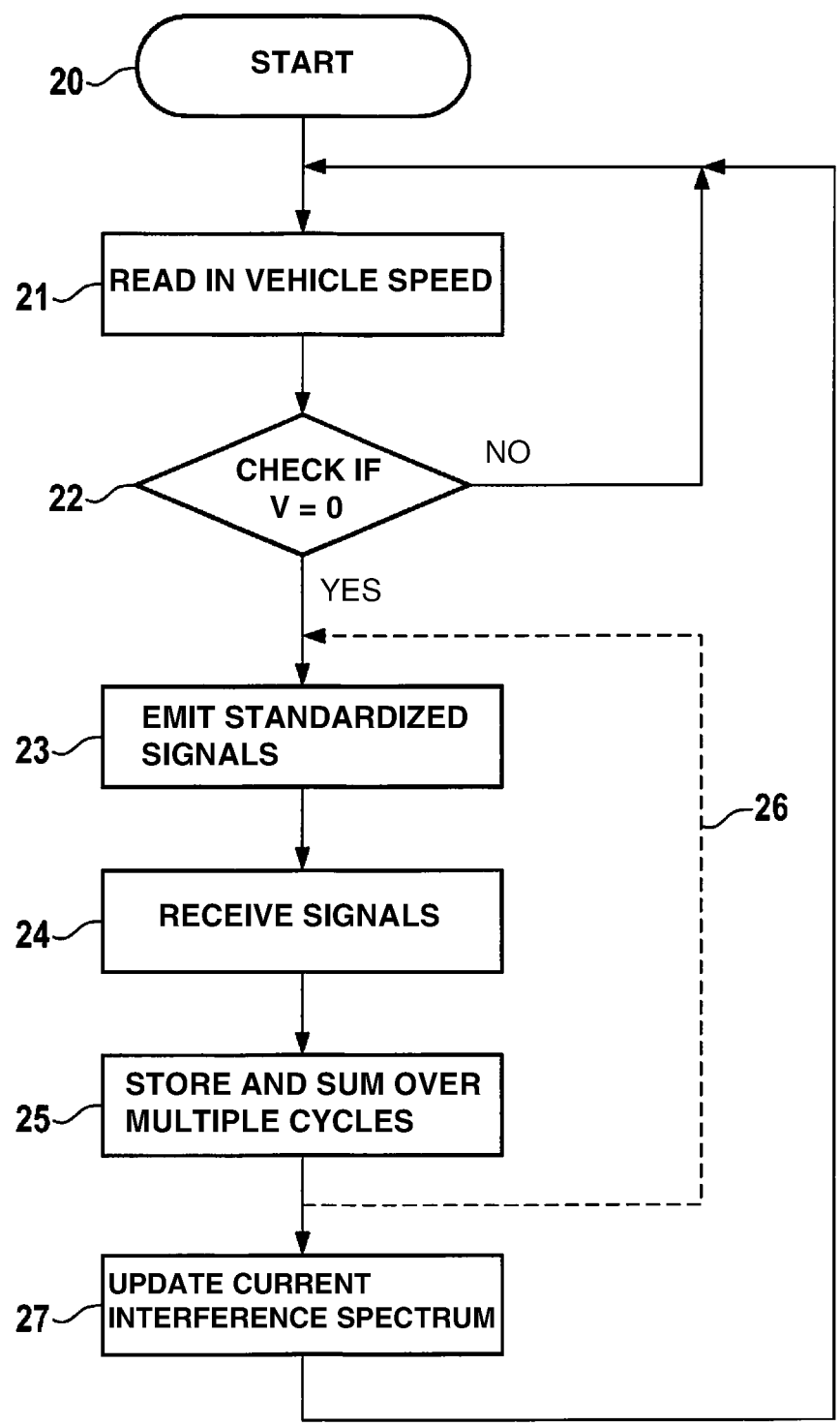
FIG. 4 is a schematic flow chart to explain the method according to the present invention.

FIG. 4 is a schematic flow chart to elucidate the method according to the present invention. The method starts in step 20, for example upon startup of the radar sensor or upon startup of the vehicle by switching on the ignition. Once the method has been started in step 20, in the subsequent step 21 the present vehicle speed v is read in. The vehicle speed can derive, for example, from a rotation speed sensor on a vehicle wheel or from a satellite navigation system or from a radar sensor that measures the relative speed with respect to stationary objects. The next step 22 checks whether the current speed v is equal to 0. If v=0, the vehicle is currently at a standstill. If v≠0, the vehicle is moving and has a relative speed greater or less than zero with reference to the recognized stationary objects, depending on the direction in which positive and negative relative speeds are defined. In this case step 22 branches to "No" and the method continues in step 21 with another retrieval of the vehicle speed v. During that time, transmitted signals are emitted by the radar sensor, and reflected partial waves are received and, based on the objects detected, an emergency braking functionality, adaptive spacing control, or other driver assistance functions are performed. If it is found in step 22 that the vehicle is currently at a standstill, i.e. if v=0, step 22 then branches to "Yes" and execution continues in step 23 by the fact that standardized transmitted signals are emitted. These standardized transmitted signals are transmitted signals that have been defined very accurately in terms of modulation shape and transmitted intensity. In the next step 24, received signals for the standardized transmitted signals are received, these received signals also containing multiple reflections 6, 7 which result in interference spectra 9 that are overlaid onto useful spectra 8. In step 25 these received signals for the standardized transmitted signals are stored and, optionally, summed over multiple cycles. After step 25 it is possible for the standardized transmitted signals to be emitted again if the vehicle is still at a standstill, and the flow chart therefore branches, after step 25, along dashed line 26 back to step 23. Provision can be made, for example, that this loop is repeated n times so that, for example, n=20 or n=50 standardized transmitted-signal cycles are performed. Thanks to the summing of these received signals for the standardized transmitted signals, interference that, for example, has occurred in only a few cycles of the n repetitions becomes averaged out by way of lesser weighting, and the interference patterns that occur regularly are taken into consideration by greater weighting in interference signal 9 that is to be ascertained. Once the optionally provided n repetitions are complete, the method continues in step 27 by the fact that the current interference spectrum 9 has been updated based on the current reflection situation, and these new interference spectra $r_1$, $r_2$, $r_3$, $r_4$ that were ascertained separately for each reception channel are used to compensate for interference in the received signals. After step 27, the method continues in step 21 by the fact that transmitted signals are emitted and the updated new interference spectrum 9 of the received signals is utilized, by subtraction, in the evaluation in order to compensate for multiple reflections in the received signal.

What is claimed is:

1. A method for reducing an influence of interference in an evaluation of at least one received signal of a radar sensor, which is installed in a vehicle, the method comprising:

emitting, in predetermined operating situations, predetermined transmitted signals and receiving reflected partial signals;

storing the received signals for the predetermined operating situations to determine an interference spectrum; and reducing the influence of interference by taking the interference spectrum into consideration in the context of signal evaluation;

wherein a first intermediate-frequency signal having a first center frequency is produced when certain of the received signals are received with no occurrence of multiple reflections, and wherein a second intermediate-frequency signal is produced when multiple reflections occur and are overlaid on the received signal, wherein the multiple reflections produce an interference spectrum having a second center frequency and a lower amplitude than the first intermediate-frequency signal, wherein the second center frequency of the interference spectrum and the first center frequency of a first intermediate-frequency spectrum result in the two spectra overlapping over frequency regions, so that the interference spectrum of the multiple reflections cannot be filtered out of the received signals, wherein when signals are emitted as transmitted signals during predetermined operating states, including with the vehicle at a standstill, a shape and an intensity of the first intermediate-frequency spectrum is known, and the current interference spectrum is ascertained and stored by determining a difference during the predetermined operating states when interference influences are overlaid during measurement of the predetermined operating states, and wherein the interference due to the multiple reflections is eliminated by subtracting the interference from the first intermediate-frequency spectrum to determine object data from the received signal.

2. The method as recited in claim 1, wherein the method is carried out separately for each reception channel of the radar sensor.

3. The method as recited in claim 1, wherein the radar sensor is disposed behind a vehicle body part.

4. The method as recited in claim 3, wherein the vehicle body part is a painted body part.

5. The method as recited in claim 3, wherein the vehicle body part is produced from plastic.

6. The method as recited in claim 3, wherein the interference is received signals that occur as a result of multiple reflections between the body part and a radome of the radar sensor.

7. The method as recited in claim 1, wherein the predetermined operating situations include a standstill state of the vehicle.

8. The method as recited in claim 1, wherein the predetermined operating situations include a standstill of the vehicle at a traffic light.

9. The method as recited in claim 1, wherein the predetermined transmitted signals are signals having a predetermined signal shape and signal power level.

10. The method as recited in claim 9, wherein the method is carried out separately for each reception channel of the radar sensor.

11. The method as recited in claim 10, wherein the received signals for the predetermined transmitted signals are averaged over several signal cycles.

12. The method as recited in claim 11, wherein the averaged signals are added to the previous correction signal.

13. A radar sensor having devices for reducing the influence of interference in an evaluation of at least one received signal of the radar sensor, which is installed in a vehicle, comprising:
- a device configured to recognize at least one predetermined operating situations;
- transmitting devices which, upon recognition of an existence of at least one of the predetermined operating situations, emits predetermined transmitted signals;
- receiving devices to receive reflected partial signals;
- a device to store at least one interference spectrum and in which the signals received for the predetermined operating situations are stored to determine the interference spectrum; and
- at least one calculation device to reduce the influence of the interference by taking the at least one interference spectrum into consideration;

wherein a first intermediate-frequency signal having a first center frequency is produced when certain of the received signals are received with no occurrence of multiple reflections, and wherein a second intermediate-frequency signal is produced when multiple reflections occur and are overlaid on the received signal, wherein the multiple reflections produce an interference spectrum having a second center frequency and a lower amplitude than the first intermediate-frequency signal, wherein the second center frequency of the interference spectrum and the first center frequency of a first intermediate-frequency spectrum result in the two spectra overlapping over frequency regions, so that the interference spectrum of the multiple reflections cannot be filtered out of the received signals, wherein when signals are emitted as transmitted signals during predetermined operating states, including with the vehicle at a standstill, a shape and an intensity of the first intermediate-frequency spectrum is known, and the current interference spectrum is ascertained and stored by determining a difference during the predetermined operating states when interference influences are overlaid during measurement of the predetermined operating states, and wherein the interference due to the multiple reflections is eliminated by subtracting the interference from the first intermediate-frequency spectrum to determine object data from the received signal.

14. The radar sensor as recited in claim 13, wherein the radar sensor has several reception channels, and wherein the interference spectrum is separately detected and/or separately stored and/or separately considered, for each channel.

15. The radar sensor as recited in claim 14, wherein for each of the several reception channels, a separate memory device or a separate region of a common memory device is provided, in which a dedicated interference spectrum for each reception channel is stored.

16. The radar sensor as recited in claim 13, wherein the device delivers to the radar sensor a signal that:
- represents the standstill state of the vehicle; or
- recognizes a red light applicable to the vehicle and is generated by a camera, oriented in a direction of travel, in the vehicle;

wherein the signal initiates emission of the predetermined transmitted signals and initiates averaging of the received signals.

17. The radar sensor as recited in claim 13, wherein the radar sensor is disposed behind a vehicle body part.

18. The radar sensor as recited in claim 17, wherein the vehicle body part is a painted body part.

19. The radar sensor as recited in claim 17, wherein the vehicle body part is made of plastic.

* * * * *